G. H. DAY.
OPHTHALMIC MOUNTING.
APPLICATION FILED FEB. 13, 1920.
1,344,293.
Patented June 22, 1920.
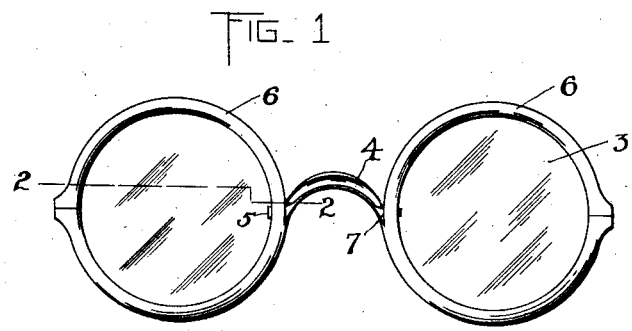
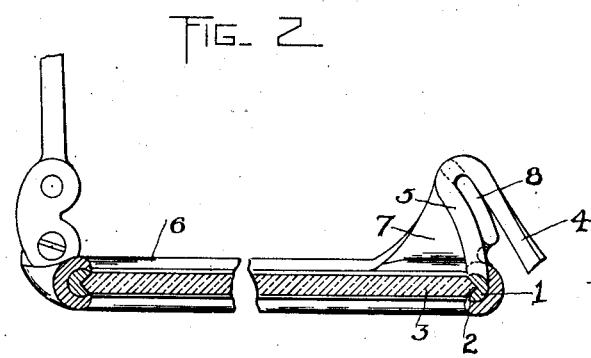
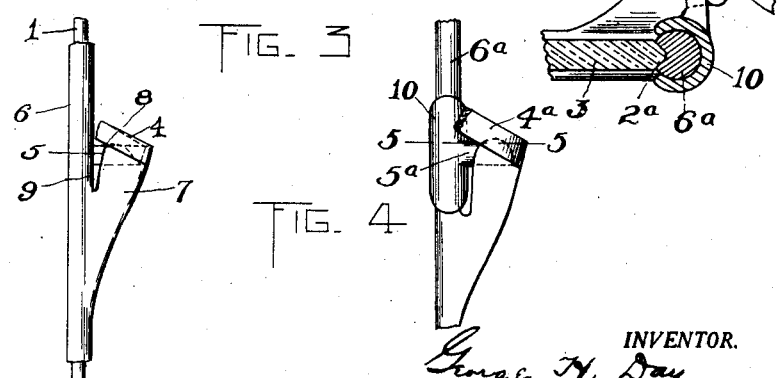
INVENTOR.
George H. Day
BY Davis & Simms
his ATTORNEYS.

UNITED STATES PATENT OFFICE.

GEORGE H. DAY, OF ROCHESTER, NEW YORK.

OPHTHALMIC MOUNTING.

1,344,293.  Specification of Letters Patent.  Patented June 22, 1920.

Original application filed December 1, 1919, Serial No. 341,676. Divided and this application filed February 13, 1920. Serial No. 358,467.

*To all whom it may concern:*

Be it known that I, GEORGE H. DAY, a citizen of the United States, and resident of Rochester, in the county of Monroe and State of New York, have invented certain new and useful Improvements in Ophthalmic Mountings, of which the following is a specification.

The present invention relates to ophthalmic mountings and more particularly to the type in which each lens frame has a non-metallic rim, an object of this invention being to provide nose bearing portions on the non-metallic rims for coöperating with the nose of the wearer, the lens frames being connected by a metallic bridge adjustable so as to permit the nose bearing portions to properly coöperate with the nose of the wearer.

To these and other ends, the invention consists of certain parts and combinations of parts, all of which will be hereinafter described, the novel features being pointed out in the appended claims.

In the drawings:

Figure 1 is a front view of an ophthalmic mounting constructed in accordance with this invention;

Fig. 2 is a section on the line 2—2, Fig. 1;

Fig. 3 is an enlarged fragmentary view showing the nose bearing portion of one of the non-metallic rims;

Fig. 4 is a detail view of another embodiment in which the lens frame is formed solely from a non-metallic rim and the bridge is connected to such rim; and Fig. 5 is a section on the line 5—5, Fig. 4.

Each lens frame in the embodiment shown in Figs. 1 to 3 comprises a metallic rim 1 which in this instance has grooves 2 on its inner periphery for receiving the periphery of a lens 3, the metallic rim being surrounded by a non-metallic rim 6, both rims in this instance being split and secured together preferably in the manner described in an application filed by me on December 1, 1919, Serial No. 341,676, from which certain features of this application have been divided. The inner metallic rims are connected by an adjustable bridge having a bridging portion 4 and forwardly extending pliable arms 5 connected at their forward ends to the inner faces of the metallic rims.

In the embodiment of the invention shown in Figs. 4 and 5 each lens frame comprises a non-metallic rim $6^a$ formed with an inner groove $2^a$ in which the lens 3 is received. The lens frames formed by the non-metallic rims are adjustably connected by a bridge having a bridging portion $4^a$ and forwardly extending pliable arms $5^a$ which have clips 10 at their forward ends clamped to the non-metallic rims $6^a$.

The feature of this invention is the provision of nose bearing surfaces on the non-metallic rims so that the adjustment of the bridge will effect proper coöperation of the nose bearing portions with the nose. These nose bearing surfaces are formed preferably from and integrally with the material of which the non-metallic rims 6 or $6^a$ are made. Each rim has a nose bearing surface 7 projecting rearwardly from its rear edge below the bridge and a portion 8 extending upwardly at the upper part of the nose bearing surface, this upwardly extending portion being projected between the adjacent end of the bridging portion 4 or $4^a$ and the pliable forward extending arm 5 or $5^a$. The forward edge of this upwardly projecting portion 8 is separated at 9 from the adjacent portion of the rim 6 so that it may be bent or deflected with reference to said non-metallic rim in order to conform comfortably to the bridge of the nose of the wearer. In the embodiment shown in Figs. 4 and 5, the clamps 10 engage the non-metallic rim in the space between the upwardly projecting portion and the main portion of the rims. The rear edge of the upwardly projecting portion 8 fits snugly at the bend between the bridging portion and the pliable portion, the best results being secured by having the nose bearing portion 7 form a substantial continuation of the nose bearing surface of the bridging portion 4 or $4^a$. As the upwardly projecting end 8 lies between the end of the bridging portion and the pliable forwardly extending arm 5 or $5^a$ it is protected against blows while at the same time it may be supported by the pliable portion 5 or $5^a$ and be adjusted laterally with the bend. This invention permits the adaptation of the guards to the nose by the adjustment of the bridging portion which is secured to the metallic rims so that no strain is placed upon the non-metallic rims during such adjustment.

What I claim as my invention and desire to secure by Letters Patent is:

1. An ophthalmic mounting comprising two lens frames, each formed of an inner metallic rim and an outer non-metallic rim, each non-metallic rim having a rearwardly extending nose bearing portion, and a metallic bridge connecting the lens frames and adjustable to permit the nose bearing portions to properly engage the nose.

2. An ophthalmic mounting comprising two lens frames, each formed of an inner metallic rim and an outer non-metallic rim, each non-metallic rim having a rearwardly extending nose bearing portion formed integrally therewith, and a metallic bridge connecting the inner metallic rims and adjustable to permit the nose bearing portions of the non-metallic rims to properly engage with the nose.

3. An ophthalmic mounting comprising a pair of inner metallic rims and a bridge connecting them having forwardly extending pliable portions secured to the metallic rims and non-metallic rims surrounding the metallic rims and having nose bearing portions extending rearwardly therefrom and projected upwardly on the inner sides of the pliable portions.

4. An ophthalmic mounting comprising a pair of inner metallic rims, a bridge having forwardly extending pliable portions secured to the metallic rims, and non-metallic rims surrounding the metallic rims and having nose bearing portions extending rearwardly therefrom and forming substantial continuations of the nose bearing surface of the bridge.

5. An ophthalmic mounting comprising two lens frames each embodying a non-metallic rim having rearwardly extending nose bearing portions, and a metallic bridge connecting the lens frames and adjustable to permit the nose bearing portions to properly engage the nose.

GEORGE H. DAY.